United States Patent

King

[15] 3,662,969
[45] May 16, 1972

[54] MEASURING TAPE TIGHTENER

[72] Inventor: Harold M. King, Jarrettsville Pike, Phoenix, Md. 21131

[22] Filed: Jan. 21, 1970

[21] Appl. No.: 4,526

[52] U.S. Cl. .............................................242/84.8, 33/138
[51] Int. Cl. ..........................................................G01b 3/10
[58] Field of Search ...................................242/84.8; 33/138

[56] References Cited

UNITED STATES PATENTS

| | | | |
|---|---|---|---|
| 1,423,516 | 7/1922 | Dieckmann | 242/84.8 X |
| 3,120,059 | 2/1964 | Quenot | 33/138 X |
| 3,164,907 | 1/1965 | Quenot | 242/84.8 X |
| 3,435,529 | 4/1969 | Quenot | 33/138 |

FOREIGN PATENTS OR APPLICATIONS 1,305,855   8/1962   France......................................33/138

*Primary Examiner*—George F. Mautz
*Assistant Examiner*—Milton Gerstein
*Attorney*—John F. McClellan, Sr.

[57] ABSTRACT

A measuring tape tightener for tensioning reel-type tapes between two arbitrary points, as between a nail at the free end of the tape and a nail at the case end of the tape, comprising a tape-brake movably attached to the case of the tape, and a spring mounted anchor adapted to attach the case to a nail or the like under spring tension, with the spring tension actuating the brake to prevent the tape from further unreeling.

15 Claims, 7 Drawing Figures

Patented May 16, 1972
3,662,969
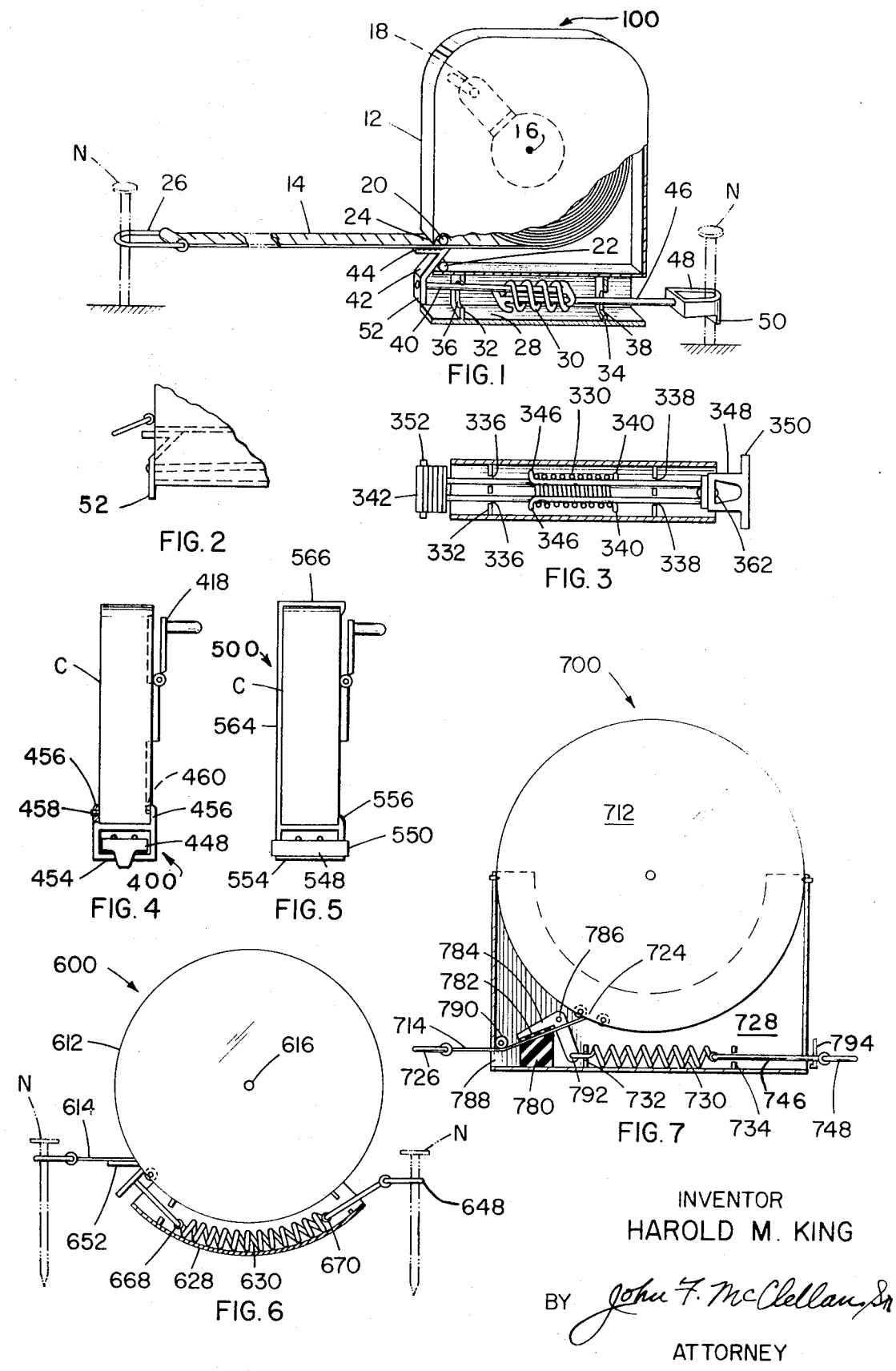
INVENTOR
HAROLD M. KING
BY John F. McClellan Sr
ATTORNEY

MEASURING TAPE TIGHTENER

This invention relates generally to measuring devices and specifically to reel-storage measuring tape assemblies.

The ordinary wind-up flexible measuring tape is perhaps the most frequently used linear measuring device known to man.

It can be bought off-the-shelf in a variety of lengths—from a few feet to several hundred feet. The design is basically the same—a storage reel, usually cased, an extensible tape for storage on the reel, and a means of winding the tape onto the reel. Usually the free end of the tape terminates in a ring for fastening to a nail or the like. Some styles include a return spring for automatic rewinding, and a brake or lock to position the tape in the extended position against the tension of the return spring. The return spring stores energy in proportion to the amount of tape extended, and therefore is impractical for long tapes, and even with short tapes can cause injury to the user when accidentally released. For these reasons, it is not widely used to tension the tape between two points, as in marking studding spacings, for example, on construction sites.

Marking studding spacings is an example of everyday problems in which the ordinary flexible tape is used as the best available solution, but for which it is still not perfectly adapted.

To mark studding spacings with presently available tapes, two men work together in positioning and tensioning the tape and marking. One man hooks the ring at the free end of the tape to a nail fixed near a first fiducial mark, such as the corner of a building under construction. He then walks away, feeding tape from the reel until he reaches the second fiducial mark, such as an adjacent corner of the building. There he tightens the tape between the two fiducial marks. Then he signals to the second man and waits, holding the tape tightly.

The second man travels along the tensioned tape, marking the studding spacings. The marking and checking may require a few minutes or, in complex structures, much longer, but the first man must hold and tension the tape for the full time required for marking by the second man. This is a wasteful practice, since one man is being used primarily as a stationary holder. It is true that the man can hold one type of tape as easily as another, and can apply exactly the right amount of tension when properly instructed, but he must be paid construction wages for the entire time.

It is a principal object of this invention to provide an efficient, simple device to replace the man holding the tape, without losing the advantages provided by having the extra man.

It is another object of this invention to provide a device of the nature described which can outperform the extra man, by serving as a tape lock when no tensioning is required, as when the partly extended tape is held by the free end and lowered into a constricted place, as between walls, or into a well.

Further objects of the invention are to provide a tape tensioner design which is easily adapted for manufacture integral with the case of the tape, or for screw-on or clampon application to any ordinary off-the-shelf tape assembly as an accessory purchased from the retailers.

I exemplify this invention in a typical embodiment consisting of three principal parts movably secured to a case of a tape assembly: a wedge-shaped member for forcing the tape against the exit of the tape assembly to lock or brake the tape at that position in proportion to the force applied to the wedge-shaped member; an anchor, such as a ring for hooking over a nail on the opposite side of the tape case from the wedge-shaped member, and a spring connecting and urging towards each other the wedge-shaped member and the anchor.

This structure, and other embodiments, advantages, and objects of the invention will become more readily apparent upon examination of the following description, and the drawings in which:

FIG. 1 is a perspective view, partly broken away, of a tape assembly incorporating features of this invention;

FIG. 2 is a detail in elevation of a portion of the FIG. 1 embodiment;

FIG. 3 is a plan view of a mechanism of an embodiment of this invention;

FIG. 4 and FIG. 5 are end elevations of embodiments of this invention; and

FIGS. 6 and 7 are side elevations of embodiments of this invention.

In the drawings, similar parts in the various embodiments are designated by similar numerals.

Turning now to FIG. 1 in detail, an embodiment 100 of this invention is shown incorporated as an integral part of a tape assembly as manufactured.

The details of the upper part of the assembly are those of the usual flexible tape device. Case 12 houses a graduated measuring tape 14 on a reel (not shown) having an axis 16. A hinged handle 18 of the ordinary type is provided on the opposite side of the case to turn the reel and wind-in the tape for storage. Anti-friction rollers 20 and 22 smooth the passage of the tape 14 through the exit aperture 24 of the case 12. A ring 26 at the free end of the tape allows hooking the end of the tape over a nail N or the like.

The lower part of the case is extended to form a chamber 28, shown with one side removed, which slidably houses a compression spring 30. The spring 30 is prevented from leaving the chamber by plates 32 and 34 fixed adjacent the ends of the spring. The end plates have slotted apertures 36 and 38 respectively.

Passing through spring 30 and engaging one end of the spring is a "T"-shaped bar 40 which also passes through slotted aperture 36, and which is pivotally secured in wedge-fitting 42. Wedge fitting 42 consists of a rigid plate angled at the upper end to fit into the tape-exit of case 12 and to wedge the tape against upper roller 20 and grip the tape, locking the tape, or frictionally braking it in the exit according the amount of tension applied to the wedge-fitting through the "T" bar 40.

The upper part of the wedge-fitting is preferably angled parallel to the angle of the tape at the exit. It may be covered with a layer 44 of ribbed rubber or other frictional material to improve the tape-gripping qualities.

A second "T" shaped bar 46, similar to the first, but aligned in spring 30 in the opposite direction to the first "T" bar so that the two bars are adapted to compress the spring, attaches the spring to anchor 48. Anchor 48 is a ring shaped member pivoted to "T" bar 46 and adapted for hooking over a nail N or other attachment to external objects in the same manner as ring 26 on the free end of the tape.

In the FIG. 1 position, the entire assembly 10 is shown tensioned between nails N as it would be when used for marking studding spacings or the like. The tension is supplied by spring 30 acting between the nails through anchor 48, "T" bars 40 and 46, wedge-fitting 42, tape 14 and ring 26. Tension of the tape in this arrangement is easily adjusted by relieving the wedge slightly and unreeling or reeling in small amounts of tape as required.

When anchor 48 is not in use, it stores away in chamber 28 which is open at both ends. Downward protrusion 50 of the anchor extends below the chamber in the stored position, providing a grip for easy withdrawal of the anchor.

FIG. 2 shows similar storage for wedge fitting 42 when the tape is to be used in the ordinary manner, without a brake or lock. Downward extension 52 provides a grip for manually withdrawing the wedge fitting from storage.

It can thus be seen that one man can fasten the free end of the tape to a fiducial nail, walk the tape out, engage the wedge fitting, and hook the anchor over a second nail under tension, so that the entire length of tape is positioned and tensioned quickly and easily. The system is adapted for one-hand operation.

This invention is also adapted for other uses. The wedge fitting can be used as a tape-brake when the anchor is in the stored position, because the spring is arranged to supply tension on the "T" bar sufficient for the purpose regardless of whether the anchor is extended. Also, the anchor can be used for attaching the case to an object regardless of whether the wedge fitting is in use or is in the stored position.

It can be seen also that when the wedge fitting and anchor are in the stored position, there is little or no interference with use of the tape in the ordinary manner, since the addition of this invention adds very little to the weight and size of the tape assembly.

FIG. 3 is a plan view of a horizontal section through the spring, showing an alternative structure to that of FIG. 1, which prevents rotation of the wedge fitting, providing guidance by bars engaging spaced slots in the end plates. Wedge fitting 342 is connected to spring 330 by paired outwardly turned hooks 340, the bar-shaped shanks of which pass through paired slots 336 in end plate 332. In similar manner anchor 348 is connected to spring 330 by a pair of outwardly turned hooks 346 the shanks of which pass through paired slots 338. One or both ends of the assembly can be pivoted as at 362.

Both the wedge fitting and the anchor can protrude laterally, as shown at 352 and 350 respectively, instead of downwardly, to provide manual grips for retraction from the stored position.

This invention can also be applied as an accessory to existing designs of tape assemblies.

FIGS. 4 and 5 illustrate methods of attaching the positioner and tensioner feature to standard flat-base cases of the semi-rounded design, or of the squared design shown as the upper part of the FIG. 1 assembly. As a separate appliance, 400, FIG. 4, this invention consists of flat walls forming a chamber structure 454 with sides 456 extending vertically beyond the chamber. The sides 456 are adapted to overlap the sides of a standard case C and to be secured to it by means of screws 458, which are threaded through the sides, or rivets or other fasteners.

Alternatively, if the sides of case C are recessed as indicated by the dotted lines, one or both sides 456 can have inward protrusions 460 which snap into the recessed sides of the case to secure the assembly.

FIG. 5 shows another arrangement in embodiment 500 for the same purpose. As in the previous Figure, the chamber structure 554 has upwardly extended sides, one of these, 556 being a short extension, and the other 564 extending up and over the upper part of the case as at 566 to form a clamp. The clamp is preferably a spring clamp which snaps into place as shown and is easily removed when desired.

FIG. 6 shows the invention in semi-circular embodiment 600 to accord with a cylindrical case configuration. This embodiment can be a unitary structure 600, as shown, or an appliance, as noted above.

Shown also is a modified spring arrangement, the spring 630 being a simple tension spring, connected at the respective proximate ends 668 and 670 to the wedge fitting 652 and the anchor 648. This arrangement does not provide the extension-limiting feature of the overlapping "T" bar arrangement described above, or the longer effective spring length, but is satisfactory for some applications.

FIG. 7 illustrates a further embodiment 700 of the invention having a different type brake, but operating in basically the same manner as the previous embodiments.

Tape 714 passes from tape case 712 through the usual tape exit 724 into chamber 728 which is shown with one side removed. The extension forming the chamber can be detachable as shown, or permanently affixed, as desired. The tape passes between a fixed brake shoe 780 and a moving brake shoe 782, and leaves the chamber through aperture 788. A roller 790 may be used to lessen friction.

Brake shoe 782 is pivoted against the tape in braking by bellcrank 784 which is secured to the chamber structure by pin 786. The opposite end of the bellcrank is attached to a tension spring 730, by a pin 792 or other suitable means. Spring 730 is contained between plates 732 and 734 and terminates in an anchor 748. Alternatively, the spring may be attached as in FIG. 1 or FIG. 3. In any case, when tension is applied to the anchor, the brake is applied.

Cam washer 794 is an optional feature. It functions to lock the tape at any required extended length when necessary without hooking the anchor 748 to anything. To do this, the tape is extended to the required length, the anchor is pulled to apply the desired braking pressure, and the cam washer is rotated 180° from the position shown to detain the bar 746. Pressure of the angled portion of the cam washer on the case (or case extension) cramps bar 746, keeping it extended and maintaining brake pressure.

Materials used in construction of this invention are preferably the non-corrosive metals used in the construction of quality measuring tape assemblies.

Obviously many modifications and variations of the present invention are possible in light of the above teachings. It is, therefore, to be understood that within the scope of the appended claims the invention may be practiced otherwise than as specifically described.

I claim:

1. A tape tensioner for tightly suspending a reel-type measuring tape assembly, having case means with an exit for the tape, between first and second arbitrary points comprising: means for attaching an extended portion of the tape to a said first point, tension-appliable tape brake means attached to said case means, and means extending to a said second point, adjacent the case means, on the opposite side from the case means exit, for resiliently connecting a portion of the tape brake means under tension at said second arbitrary point for thereby applying said tape brake means for locking and tensioning said tape assembly tightly between said points.

2. A tape tensioner as recited in claim 1, wherein an extension of the case means is provided for containing a portion of said means for resiliently connecting a portion of the tape-brake means.

3. A tape tensioner as recited in claim 2, wherein the extension of the case means has an open end adjacent the case means exit for receiving and storing a portion of the means for braking the tape.

4. A tape tensioner as recited in claim 3, wherein the extension of the case means has an open end adjacent said means extending to a point for resiliently connecting a portion of the tape brake means for receiving and storing a portion of the means for braking the tape.

5. A tape tensioner as recited in claim 1, wherein said portion of the tape-brake means comprises an angled member for wedging against the tape in the exit in the case means.

6. A tape tensioner as recited in claim 5, wherein said tape-brake means portion has frictional means on a face thereof for gripping the tape.

7. A tape tensioner as recited in claim 1, and means for preventing rotation of the tape-brake means relative to the case means, including a slotted endplate, and plural slot-engaging means connecting the tape brake-means and the means for resiliently connecting a portion of the tape brake means.

8. A tape tensioner as recited in claim 5, wherein means for resiliently connecting a portion of the tape-brake means includes a compression spring, and wherein said portion of the tape brake means and the means for resiliently connecting a portion of the tape brake means have members extending respectively therefrom, and in part overlapping, for compressing the compression spring.

9. A tape tensioner as recited in claim 1, wherein the means for resiliently connecting a portion of the tape brake means includes a tension spring proximately connected at an end thereof to the tape brake means.

10. A tape tensioner as recited in claim 2, wherein the case means extension is detachable from the case means and has a portion thereof adapted for fastener-attachment to the case means.

11. A tape tensioner as recited in claim 2, wherein the case means extension is detachable from the case means and has a portion thereof adapted for clamping attachment to the case means.

12. A tape tensioner as recited in claim 3, wherein at least one of said tape brake means and means for resiliently connecting a portion of the tape brake means has a protrusion therefrom for facilitating manual gripping of said means.

13. A tape tensioner as recited in claim 2, wherein the case means has a curved configuration and the case means extension is curved in accordance therewith.

14. A tape tensioner as recited in claim 1, wherein the tape brake means comprises: a fixed brake shoe, and a movable brakeshoe opposed thereto and operatively attached to said means for resiliently connecting a portion of the tape brake means.

15. A tape tensioner as recited in claim 1, and a detainer for fixing the means for resiliently connecting a portion of the tape brake means in an extended position by pressure on the case means, thereby locking the tape.

* * * * *